United States Patent
Beutel et al.

(10) Patent No.: US 7,935,453 B2
(45) Date of Patent: May 3, 2011

(54) MEMBRANE WITH OPTIMIZED DIMENSIONS FOR A FUEL CELL

(75) Inventors: Matthew J. Beutel, Webster, NY (US); Saurabh Vyas, Rochester, NY (US); Ronald L. James, North Chili, NY (US); Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 69 days.

(21) Appl. No.: 11/972,211

(22) Filed: Jan. 10, 2008

(65) Prior Publication Data

US 2009/0181275 A1   Jul. 16, 2009

(51) Int. Cl.
*H01M 8/10* (2006.01)

(52) U.S. Cl. ........ 429/481; 429/479; 429/480; 429/482; 429/483

(58) Field of Classification Search ...... 429/30
See application file for complete search history.

(56) References Cited

U.S. PATENT DOCUMENTS

| | | | |
|---|---|---|---|
| 6,057,054 A * | 5/2000 | Barton et al. | 429/42 |
| 6,316,139 B1 * | 11/2001 | Uchida et al. | 429/465 |
| 6,974,648 B2 | 12/2005 | Goebel | |
| 2004/0096716 A1 * | 5/2004 | Pierpont et al. | 429/26 |
| 2006/0127706 A1 | 6/2006 | Goebel et al. | |
| 2007/0065705 A1 * | 3/2007 | Boucher et al. | 429/35 |
| 2008/0107944 A1 * | 5/2008 | Goebel | 429/26 |
| 2008/0145712 A1 * | 6/2008 | Pierpont et al. | 429/12 |

* cited by examiner

*Primary Examiner* — Patrick Ryan
*Assistant Examiner* — Ladan Mohaddes
(74) *Attorney, Agent, or Firm* — Fraser Clemens Martin & Miller LLC; J. Douglas Miller (57) ABSTRACT

A UEA for a fuel cell having an active region and a feed region is provided. The UEA includes an electrolyte membrane disposed between a pair of electrodes. The electrolyte membrane and the pair of electrodes is further disposed between a pair of DM. The electrolyte membrane, the pair of electrodes, and the DM are configured to be disposed at the active region of the fuel cell. A barrier film coupled to the electrolyte membrane is configured to be disposed at the feed region of the fuel cell. The dimensions of the electrolyte membrane are thereby optimized. A fuel cell having the UEA, and a fuel cell stack formed from a plurality of the fuel cells, is also provided.

19 Claims, 5 Drawing Sheets

MEMBRANE WITH OPTIMIZED DIMENSIONS FOR A FUEL CELL

FIELD OF THE INVENTION

The present disclosure relates to a fuel cell and, more particularly, to a fuel cell unitized-electrode-assembly (UEA) having an electrolyte membrane with optimized dimensions.

BACKGROUND OF THE INVENTION

A fuel cell has been proposed as a clean, efficient and environmentally responsible power source for various applications. In particular, individual fuel cells can be stacked together in series to form a fuel cell stack capable of supplying a quantity of electricity sufficient to power an electric vehicle. Accordingly, the fuel cell has been identified as a potential alternative for a traditional internal-combustion engine used in modern vehicles.

A common type of fuel cell is known as a proton exchange membrane (PEM) fuel cell. The PEM fuel cell includes three basic components: a cathode electrode, an anode electrode, and an electrolyte membrane. The electrodes typically include a finely divided catalyst, such as platinum, supported on carbon particles and mixed with an ionomer. The electrolyte membrane is disposed between the electrodes and is generally formed from a proton-conducting polymer such as Nafion® polymer, commercially available from E.I. du Pont de Nemours and Company, for example. The electrolyte membrane and electrodes are disposed between porous diffusion media (DM). The DM facilitates a delivery of gaseous reactants, typically hydrogen and oxygen, to the electrodes for an electrochemical fuel cell reaction. Generally, the catalyst is coated on the electrolyte membrane (CCM) to form a membrane-electrode-assembly (MEA). In another typical configuration, the DM is catalyst-coated (CCDM) to form the electrodes of the fuel cell.

The electrolyte membrane, electrodes, and DM are disposed between a pair of fuel cell plates and sealed with a gasket. When the electrolyte membrane, electrodes, and DM are assembled as a unit, for example, with other components such as the gasket and the like, the assembly is called a unitized electrode assembly (UEA).

Each fuel cell plate has an active region to which the gaseous reactants are delivered for distribution to the electrodes. The fuel cell plate also includes a feed region having flow channels configured to deliver the gaseous reactants from a supply source to the active region. The electrolyte membrane typically extends across the feed region and terminates at the gasket. The electrolyte membrane is employed to separate and inhibit an intermixing of the gaseous reactants. However, the DM is generally limited to the active region so that there is adequate space for the gaseous reactants to flow through the flow channels in the feed region. The fuel cell may also include metal shims or foils in the feed region that provide a stiffness to the electrolyte membrane and tha laminated with a chemically inert material to inhibit a corrosion of the fuel cell plates that contact the electrolyte membrane. However, both the electrolyte membrane and the inert materials are prone to swelling. Swelling of the electrolyte membrane is known to cause flow channel blockage, delami t militate against a blockage of the flow channels by the membrane.

The electrolyte membrane in the feed region is typically coated ornation from the metal shims, and result in fuel cell instability. The electrolyte membrane also is generally not compatible with certain fuel cell or automotive fluids, such as coolants, grease, and oil, with which the electrolyte membrane may come into contact during operation. The electrolyte membrane that extends into the feed region or to an outer perimeter of the fuel cell is particularly susceptible to contamination with these types of fluids.

There is a continuing need for a fuel cell having an electrolyte membrane with optimized dimensions. Desirably, the optimized membrane dimensions increase fuel cell robustness and reliability. The optimized electrolyte membrane also desirably reduces the fuel cell complexity and cost and improves manufacturability of the fuel cell.

SUMMARY OF THE INVENTION

In concordance with the instant disclosure, a UEA that has an electrolyte membrane not substantially disposed in the feed region of a fuel cell, increases the fuel cell robustness and reliability by militating against flow channel blockage and corrosion of the fuel cell plate, and reduces the fuel cell manufacturing complexity and cost, is surprisingly discovered.

In one embodiment, a UEA is employed in a fuel cell having an active region and a feed region. The UEA includes an electrolyte membrane disposed between a pair of electrodes. The electrolyte membrane and the pair of electrodes are disposed between a pair of DM. The electrolyte membrane, the pair of electrodes, and the DM are configured to be disposed adjacent the active region of the fuel cell. A barrier layer coupled to the electrolyte membrane is configured to be disposed adjacent the feed region of the fuel cell.

In a further embodiment, a fuel cell includes the UEA disposed between a pair of fuel cell plates. Each of the fuel cell plates has an active region and a feed region. The electrolyte membrane, the electrodes, and the DM are disposed adjacent the active region. The barrier film is disposed adjacent the feed region. The dimensions of the electrolyte membrane are thereby optimized.

In another embodiment, a plurality of the fuel cells with the optimized electrolyte membrane may be stacked to form a fuel cell stack. The fuel cell stack has an enhanced robustness and reliability.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features.

Figure 1:
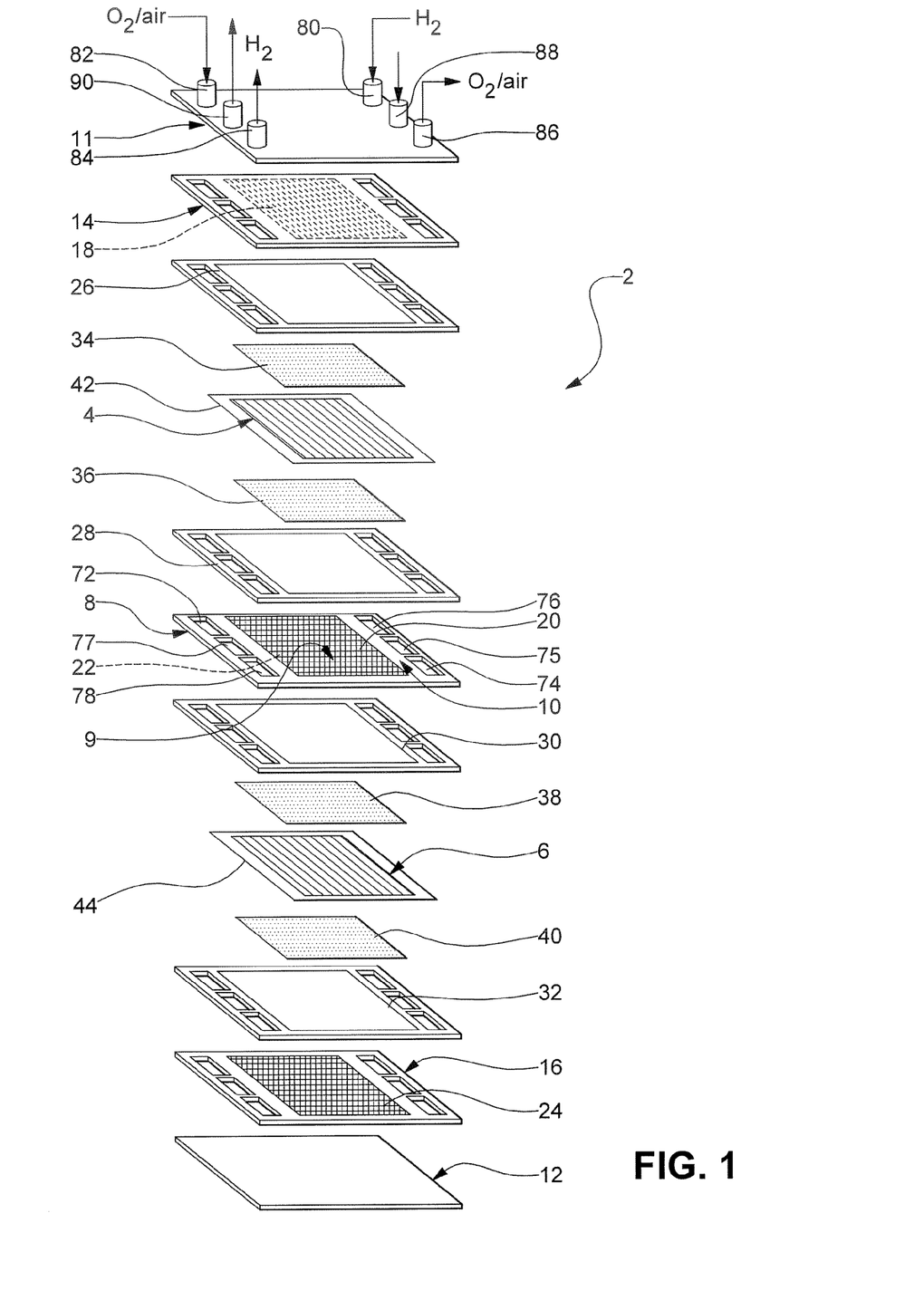
FIG. 1 is illustrates a schematic, exploded perspective view of a PEM fuel cell stack with barrier film according to the present disclosure, showing only two cells.

FIG. 1 depicts an exemplary fuel cell stack 2 according to the present disclosure. The fuel cell stack 2 has a pair of MEAs 4, 6 separated from each other by an electrically conductive bipolar plate 8. Although MEAs 4, 6 of a CCM design are shown for purpose of simplicity, it should be understood that the fuel cell stack 2 may employ a CCDM design if desired.

The bipolar plate 8 has an active region 9 and a feed region 10. The bipolar plate 8 may have a nested plate design, for example, as is described in U.S. Pat. No. 6,974,648 and in U.S. Pat. App. Pub. No. 2006/0127706, the disclosures of which are incorporated herein by reference in their entireties. For simplicity, only a two-cell stack (i.e. one bipolar plate) is illustrated and described in FIG. 1, it being understood that the typical fuel cell stack 2 will have many more such cells and bipolar plates.

The MEAs 4, 6, and particularly the electrolyte membranes of the MEAs 4, 6, have optimized or "thrifted" dimensions that do not extend substantially beyond the active region 9. For example, the MEAs 4, 6 are substantially limited to the locations of the fuel cell stack 2 electrochemical reactions. It should be understood that the MEAs 4, 6 may be optimized on all edges, or on select edges, as desired.

The MEAs 4, 6 and bipolar plate 8 are stacked together between a pair of clamping plates 11, 12 and a pair of unipolar end plates 14, 16. The clamping plates 11, 12 are electrically insulated from the end plates 14, 16 by a gasket or a dielectric coating (not shown). The unipolar end plates 14, both working faces of the bipolar plate 8, and the unipolar end plate 16 include flow fields 18, 20, 22, 24. The flow fields 18, 20, 22, 24 distribute reactants, such as hydrogen gas, for example, from a compressed hydrogen source or a reformate, and oxygen, for example, from air over an anode and a cathode, respectively, of the MEAs 4, 6.

Nonconductive gaskets 26, 28, 30, 32 provide seals and an electrical insulation between the several components of the fuel cell stack 2. Gas-permeable DM 34, 36, 38, 40 abut the anodes and the cathodes of the MEAs 4, 6. The end plates 14, 16 are disposed adjacent the DM 34, 40, respectively, while the bipolar plate 8 is disposed adjacent the DM 36 on the anode face of MEA 4. The bipolar plate 8 is further disposed adjacent the DM 38 on the cathode face of MEA 6.

Barrier films 42, 44 are positioned between the MEAs 4, 6 and the nonconductive gaskets 26, 28, 30, 32. The barrier films 42, 44 are disposed adjacent the feed region 10 of the bipolar plate 8. The barrier films 42, 44 are electrically nonconductive. The MEAs 4, 6 are coupled to the barrier films 42, 44. The barrier films 42, 44 may also be coupled to the nonconductive gaskets 26, 28, 30, 32. In particular examples, the barrier films 42, 44 may be formed respectively integral with the nonconductive gaskets 26, 28, 30, 32. The barrier films 42, 44 may include at least one seal, for example, molded on the barrier films 42, 44 as seal carriers. It should be appreciated that having the seal formed on the barrier films 42, 44 may facilitate the employment of fewer components in assembling the fuel cell stack 2.

The bipolar plate 8, unipolar end plates 14, 16, and the gaskets 26, 28, 30, 32 each include a cathode supply aperture 72 and a cathode exhaust aperture 74, a coolant supply aperture 75 and a coolant exhaust aperture 77, and an anode supply aperture 76 and an anode exhaust aperture 78. Supply manifolds and exhaust manifolds of the fuel cell stack 2 are formed by an alignment of the respective apertures 72, 74, 75, 77, 76, 78 in the bipolar plate 8, unipolar end plates 14, 16, and the gaskets 26, 28, 30, 32. The hydrogen gas is supplied to an anode supply manifold via an anode inlet conduit 80. The air is supplied to a cathode supply manifold of the fuel cell stack 2 via a cathode inlet conduit 82. An anode outlet conduit 84 and a cathode outlet conduit 86 are also provided for an anode exhaust manifold and a cathode exhaust manifold, respectively. A coolant inlet conduit 88 is provided for supplying liquid coolant to a coolant supply manifold. A coolant outlet conduit 90 is provided for removing coolant from a coolant exhaust manifold. It should be understood that the configurations of the various inlets 80, 82, 88 and outlets 84, 86, 90 in FIG. 1 are for the purpose of illustration, and other configurations may be chosen as desired.

The barrier films 42, 44 are employed to separate the hydrogen gas and the air supplied to the fuel cell stack 2 in the feed region 10, particularly since the optimized MEAs 4, 6 are limited substantially to the active region 8. It is surprisingly found that joint configurations for the MEAs 4, 6 and barrier films 42, 44, as described in various embodiments hereinafter, militate against a separation of the MEAs 4, 6 and the barrier films 42, 44 under typical fuel cell stack 2 operating conditions. The joint configurations may be employed to reliably couple the MEAs 4, 6 and the barrier films 42, 44, thereby enabling the use of optimized electrolyte membrane dimensions. At least one of bonding, such as with a chemical adhesive, fusing, and compression may be employed to further couple the MEAs 4, 6 and the barrier films 42, 44 under the joint configurations described.

In the various exemplary joint configurations shown in FIGS. 2a to 5d, a UEA 200 of the fuel cell stack 2 may include a barrier layer 202, an electrolyte membrane 204, a first electrode 206, a second electrode 208 at least one of a first joint film 210 and a second joint film 212, a first DM layer 214, and a second DM layer 216. The first electrode 206 and the second electrode 208 may be bonded to either the membrane 204 in a CCM configuration or one of the DM layer 214, 216 in a CCDM configuration as desired. Combinations of the joint configurations shown in FIGS. 2a to 5d, for example, having one configuration along the feed region 9 and another configuration along the active region 10 may also be employed. A skilled artisan should appreciate that the joint configurations described are for the purposes of illustration and that other suitable joint configurations may be selected as desired.

The barrier layer 202 corresponds substantially to one of the barrier films 42, 44 shown in FIG. 1. The barrier layer 202 is formed from a material that does not substantially swell or degrade with exposure to the fuel cell reactants and automotive fluids, such as coolant, oil, and grease. In particular, the barrier film 202 is formed from a material that is able to provide both electrical and mechanical separation. The barrier layer 202 may also be formed as a unitary layer to militate against delamination. As a nonlimiting example, the barrier layer 202 is formed from one of a polyethylene naphthalate (PEN), a polyethylene terephthalate (PET), and a polyimide polymer such as Kapton® polymer commercially available from E. I. du Pont de Nemours and Company, for example. It should be understood that other suitable polymeric materials for the barrier layer 202 may be selected as desired.

The electrolyte membrane 204, the first electrode 206, and the second electrode 208, when assembled, correspond substantially to one of the MEAs 4, 6 described in FIG. 1. The first and second DM layers 214, 216 correspond substantially to the DMs 36, 38 disclosed in FIG. 1.

Referring now to FIGS. 2a to 2d, first, second, third, and fourth joint configurations, where the barrier layer 202 overlaps the electrolyte membrane 204 to form a joint 218, respectively, are shown. Both the first DM layer 214 and the second DM 216 layer overlap the joint 218 in FIGS. 2a to 2c.

Figure 2A:
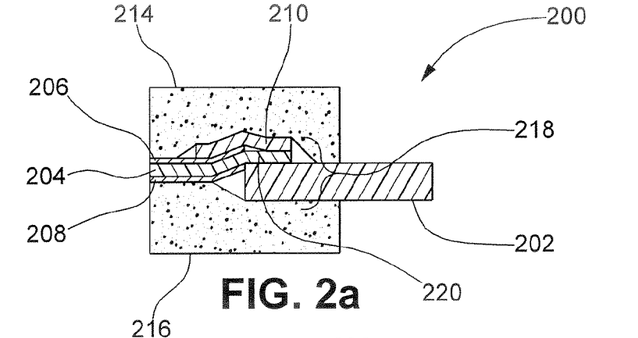
FIG. 2a is a fragmentary, cross-sectional view of a UEA with a barrier film layered between a pair of DM and a joint film, the barrier film overlapping an electrolyte membrane and a joint film.

In the first joint configuration shown in FIG. 2a, an exposed portion 220 of the electrolyte membrane 204 extends beyond the first and second electrodes 206, 208. The exposed portion 220 thereby provides a non-coated surface for coupling to the barrier layer 202. The barrier layer 202 is disposed on at least a portion of the electrolyte membrane 204 and may be bonded, for example, as described hereinabove. The first joint film 210 covers and seals an end of the first electrode 206 and the electrolyte membrane 204. As the first and the second electrodes 206, 208 are separated by the first joint film 210 and the barrier layer 202, respectively, contact between one of the electrodes 206, 208 and the opposing DM 214, 216 is inhibited. A short circuit is thereby militated against.

The barrier layer 202, the electrolyte membrane 204, the first and second electrodes 206, 208, and the joint film 210 are layered between the first DM 214 and the second DM 216. The first DM 214 and the second DM 216 overlap the joint configuration. The first and second DMs 214, 216 provide a mechanical pressure on the barrier layer 202 and the electrolyte membrane 204 when the fuel cell stack 2 is placed under compression during an assembly thereof. In particular embodiments, the mechanical pressure is sufficient to couple the barrier layer 202 and the electrolyte membrane 204 with or without a supplemental bonding such as by bonding with a chemical adhesive.

Figure 2B:
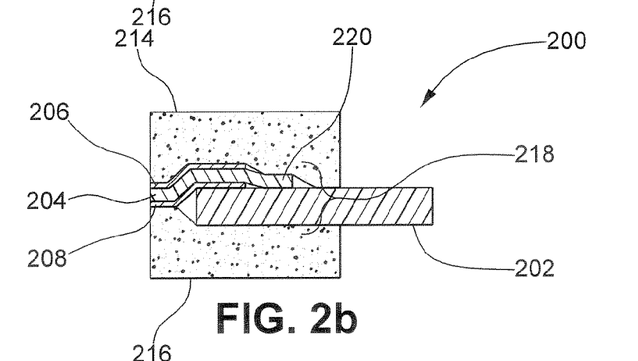
FIG. 2b is a fragmentary, cross-sectional view of a UEA with a barrier film layered between a pair of DM, the barrier film overlapping an electrode and an electrolyte membrane.

As shown in the second joint configuration of FIG. 2b, both the electrolyte membrane 204 and the second electrode 208 are disposed on a portion of the barrier layer 202. The barrier layer 202 is disposed between the second electrode 208 and the second DM 216. The exposed portion 220 of the electrolyte membrane 204 that extends beyond the first and second electrodes 206, 208 is coupled to the barrier layer 202.

Figure 2C:
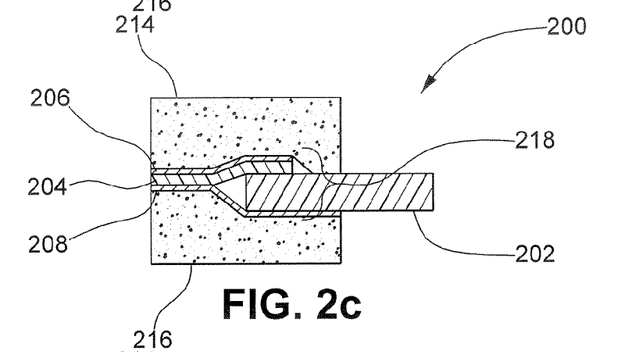
FIG. 2c is a fragmentary, cross-sectional view of a UEA with a barrier film layered between a DM and a catalyst coated DM, the barrier film disposed between a catalyst coated DM and an electrolyte membrane.

With reference to FIG. 2c, the third joint configuration includes the barrier layer 202 disposed between the second electrode 208 and the electrolyte membrane 204. It should be recognized that the second and third joint configurations do not employ the first and second joint films 210, 212, and therefore, may have a reduced manufacturing complexity.

Figure 2D:
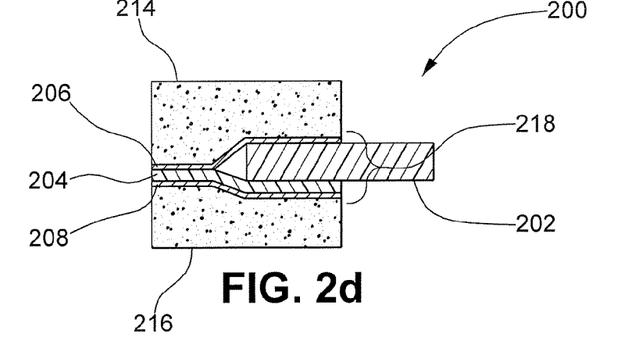
FIG. 2d is a fragmentary, cross-sectional view of a UEA with a barrier film layered between pair of catalyst coated DM, the barrier film disposed between an catalyst coated DM and an electrolyte membrane.

In FIG. 2d, the fourth joint configuration includes the barrier layer 202 disposed between the first DM 214 and the electrolyte membrane 204. The first DM 214 is catalyst coated to form the first electrode 206. The second DM 216 is also catalyst coated to form the second electrode 208 and the electrolyte membrane 204 disposed thereon, for example, by bonding before a cutting of the second DM 216. An edge of each of the electrolyte membrane 204, the electrodes 206, 208, and the DM 214, 216 are also aligned in the fourth joint configuration shown.

Figure 3A:
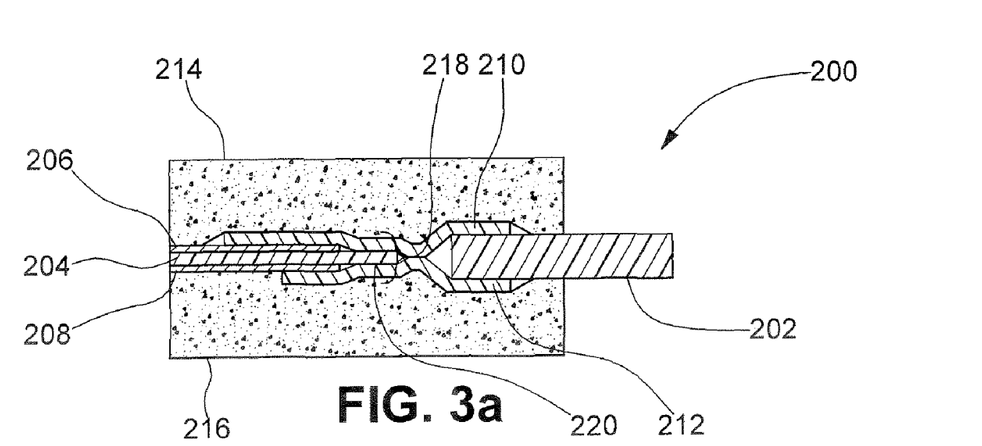
FIG. 3a is a fragmentary, cross-sectional view of a UEA with a barrier film layered between a pair of DM, the barrier film disposed between a pair of joint films.
Figure 3B:
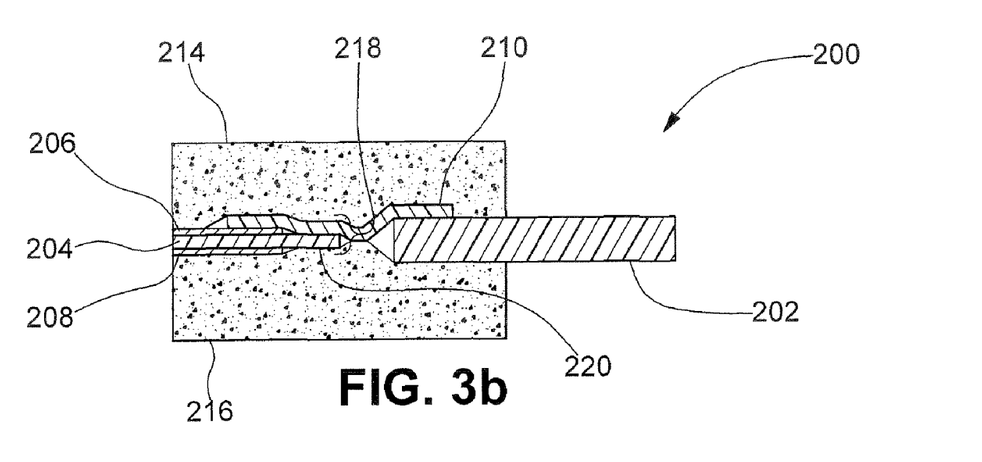
FIG. 3b is a fragmentary, cross-sectional view of a UEA with a barrier film layered between a pair of DM, the barrier film overlapping a single joint film.

Exemplary fifth and sixth joint configurations are shown in FIGS. 3a and 3b, respectively. In the fifth and sixth joint configurations, the barrier layer 202 overlaps at least one of the first and second joint films 210, 212. At least one of the first and second joint films 210, 212 is further disposed on the exposed portion 220 of the electrolyte membrane 204. The first DM 214 and the second DM 216 sandwich the joint 218 formed by the overlapping of the barrier layer 202 and at least one of the first and second joint films 210, 212.

In the fifth joint configuration shown in FIG. 3a, the exposed portion 220 of the electrolyte membrane 204 and the barrier layer 202 are layered between the first and second joint films 210, 212. The first joint film 210 is disposed above the electrolyte membrane 204 and the barrier layer 202 and is further disposed adjacent the first electrode 206. The second joint film 212 is disposed below the electrolyte membrane 204 and the barrier layer 202 and is further disposed adjacent the second electrode 208. The ends of the first and second electrodes 206, 208 are sealed, respectively, by the first and second joint films 210, 212.

In FIG. 3b, the sixth joint configuration includes an overlapping of the first joint film 210 with each of the first electrode 206, the exposed portion 220 of the electrolyte membrane 204, and the barrier layer 202.

Figure 4A:
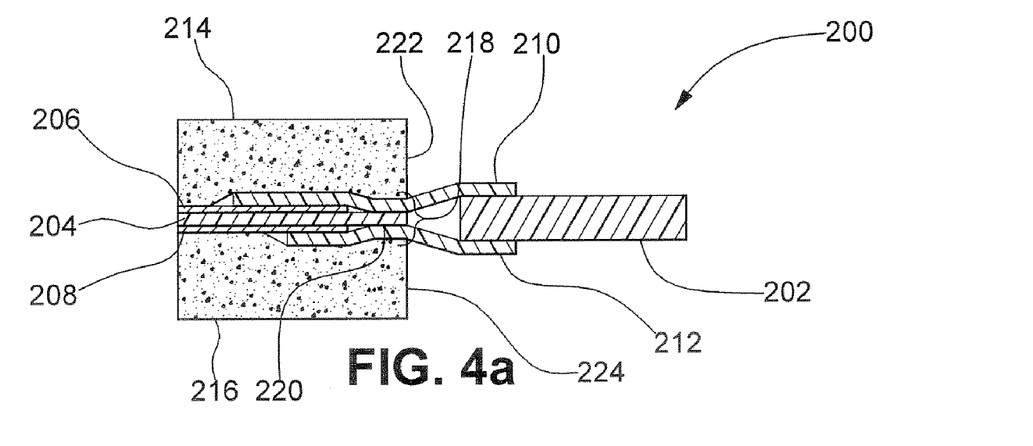
FIG. 4a is a fragmentary, cross-sectional view of a UEA with a barrier film disposed outside of the DM, the barrier film disposed between a pair of joint films.
Figure 4B:
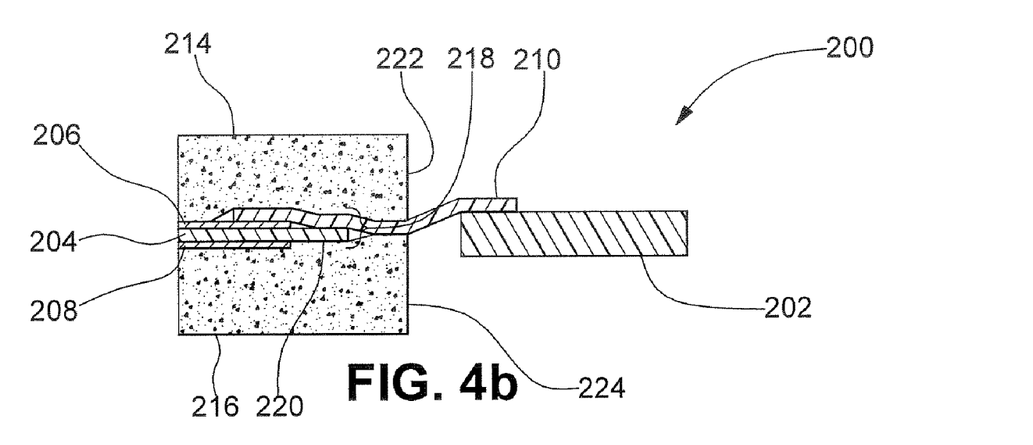
FIG. 4b is a fragmentary, cross-sectional view of a UEA with a barrier film disposed outside of the DM, the barrier film overlapping a single joint film.

Seventh and eighth joint configurations are shown in FIGS. 4a and 4b. The seventh and eighth joint configurations include the barrier layer 202 disposed outside of the first DM 214 and the second DM 216. In FIG. 4a, the first and the second joint films 210, 212 are disposed on the first and second electrodes 206, 208, respectively, and the exposed portion 220 of the electrolyte membrane 204. The exposed portion 220 terminates substantially at edges 222, 224 of the first DM 214 and the second DM 216, respectively. The first and second joint films 210, 212 extend beyond the first and second DMs 214, 216 and sandwich the barrier layer 202.

In the eighth joint configuration shown in FIG. 4b, only the first joint film 210 overlaps a portion of the barrier layer 202 film outside of the first DM 214 and the second DM 216. The first and second DMs 214, 216 may be compressed at the edges 222, 224 thereof with the first joint film 210 to seal the exposed portion 220 of the electrolyte membrane 204.

As the barrier layer 202 is not covered by the first and second DMs 214, 216, the joint films 210, 212 may be bonded to the barrier layer 202 by means other than compressive force. A thickness of the barrier layer 202 in the seventh and eighth joint configurations may be greater than when the barrier layer 202 is layered between the DMs 214, 216. The thicker barrier layer 202 provides an improved stiffness that militates against blockage of flow channels in the feed regions 10 of the fuel cell stack 2. A skilled artisan should also appreciate that suitable thicknesses may vary with the fuel cell stack 2 design, and may be employed as desired.

Referring now to FIGS. 5*a* to 5*d*, exemplary ninth, tenth, eleventh, and twelfth joint configurations for the UEA 200 are shown, respectively. The barrier layer 202 is disposed in-line with one of the first DM 214 and the second DM 216. In a particular embodiment, the barrier layer 202 has a thickness that is substantially the same as a thickness of one of the first and second DM 214, 216. It should be understood that, having substantially the same thickness as the in-line DM 214, 216, a compressive force may be provided that is sufficient to seal the joint 218 between the barrier layer 202 and the electrolyte membrane 204, with or without supplemental bonding.

Figure 5A:
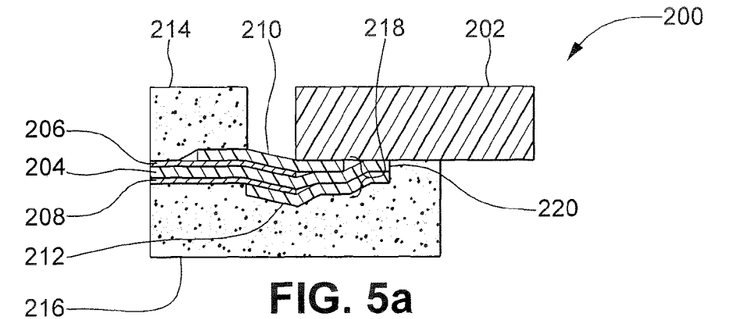
FIG. 5a is a fragmentary, cross-sectional view of a UEA with a barrier film layered on a single DM, the barrier film overlapping an electrolyte membrane disposed between a pair of joint films.

In the ninth joint configuration shown in FIG. 5*a*, the barrier layer 202 is disposed in-line with the first DM 214. A portion of the barrier layer 202 is layered with each of the first joint film 210, the exposed portion 220 of the electrolyte membrane 204, and the second DM 216. The first joint film 210 and the second joint film 212 sandwich the assembly of the first electrode 206, the electrolyte membrane 204, and the second electrode 208. The first and second joint films 210, 212 seal the first and second electrodes 206, 208, respectively.

Figure 5B:
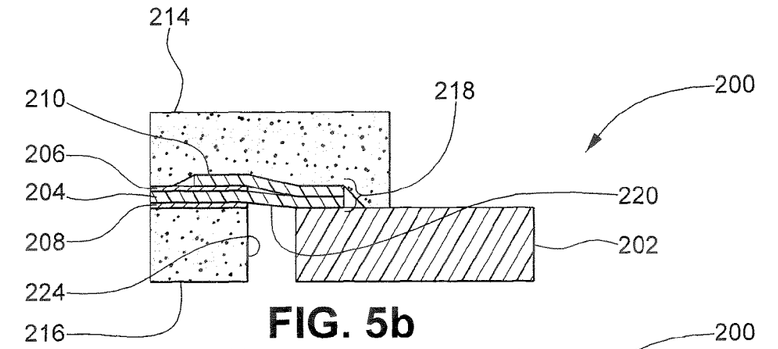
FIG. 5b is a fragmentary, cross-sectional view of a UEA with a barrier film layered on a single DM and a joint film, the barrier film overlapping an electrolyte membrane and the joint film.

The tenth joint configuration of FIG. 5*b* includes the barrier layer 202 disposed in-line with the second DM 216. The barrier layer 202 is layered with the exposed portion 220 of the electrolyte membrane 204 and the first DM 214. The second electrode 208 terminates substantially at the edge 224 of the second DM 216.

Figure 5C:
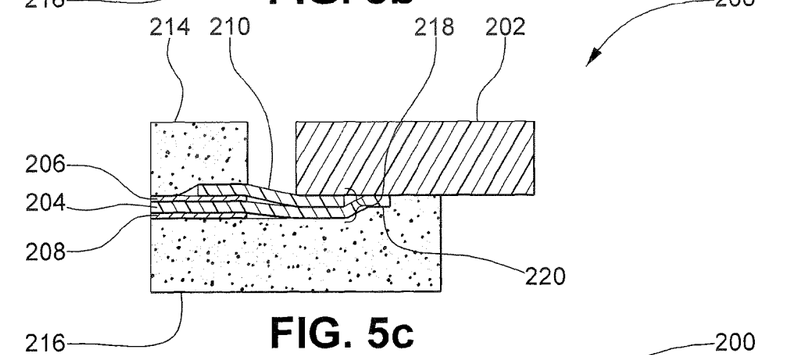
FIG. 5c is a fragmentary, cross-sectional view of a UEA with a barrier film layered on a single DM, the barrier film overlapping an electrolyte membrane and a joint film.

In the eleventh joint configuration shown in FIG. 5*c*, a portion of the barrier layer 202 is disposed on each of the first joint film 210, the exposed portion 220 of the electrolyte membrane 204, and the second DM 216. The eleventh configuration does not include the second joint film 212.

Figure 5D:
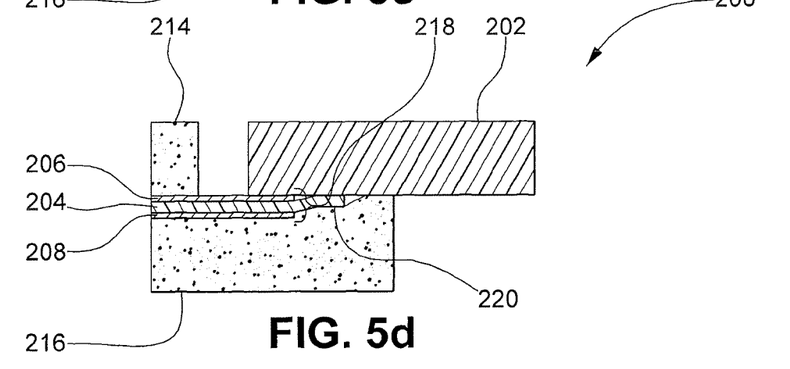
FIG. 5d is a fragmentary, cross-sectional view of a UEA with a barrier film layered on a single DM, the barrier film overlapping an electrode and an electrolyte membrane.

With reference to FIG. 5*d*, the barrier layer 202 is disposed in-line with the first DM 214. A portion of the barrier layer 202 is further disposed on each of the first electrode 206, the electrolyte membrane 204, and the second DM 216. The twelfth joint configuration according to FIG. 5*d* does not employ the joint films 210, 212. It should be appreciated that the joint configurations of FIGS. 5*c* and 5*d*, employing one or none of the joint films 210, 212, provides for less manufacturing complexity in comparison to the joint configurations having both joint films 210, 212.

It is surprisingly found that the joint configurations disclosed herein facilitate a bond between the barrier layer 202 and the electrolyte membrane 204 that allows the dimensions of the electrolyte membrane 204 and the electrodes 206, 208 to be optimized. In particular embodiments, the electrolyte membrane 204 does not extend substantially into the feed region 10 of the fuel cell stack 2. Thus, the electrolyte membrane 204 does not become contaminated with fuel cell and automotive fluids such as coolant, grease, and oil, which the fuel cell stack 2 may be exposed to in operation.

A skilled artisan should appreciate that at least one of the barrier layer 202 and the joint films 210, 212 of the present disclosure, depending on the joint configuration selected, may also militate against a degradation of the electrolyte membrane 204 caused by the DM 214, 216. For example, the barrier layer 202 and the joint films 210, 212 overlap the electrolyte membrane 204 and may inhibit a degradation or cutting by the DM 214, 216 edges 222, 224, when the components are placed under compression.

Various joint configurations according to the present disclosure may further minimize a volume necessary to form the bond, due to the elimination of supplemental adhesives. In particular embodiments, when the DM 214, 216 overlap the joints 218 and the fuel cell stack 2 is placed under compression, a mechanical pressure sufficient to couple the barrier layer 202 and the electrolyte membrane 204 is provided. The coupling of the exposed portion 220 of the electrolyte membrane 204 to the barrier layer 202 may also provide a robust seal substantially impervious to the fuel cell stack 2 fluids.

A thickness of the barrier layer 202 may further be selected to militate against an undesirable over-compression of the joint 218 or an undesirable reliance on supplement bonding such as by chemical adhesion between the barrier layer 202 and the electrolyte membrane 204. The barrier layer 202 thickness may be suitable for supporting one or more polymeric seals. The barrier layer 202, having a suitable thickness, also provides an improved stiffness to the feed region 10. The barrier layer 202 may militate against a blockage of flow channels in the feed regions 10 of the fuel cell stack 2, particularly if the barrier layer 202 is not otherwise supported, for example, with a metal shim. The barrier layer 202 minimizes to flow channel intrusions and the accompanying flow maldistribution throughout the fuel cell stack 2.

It should be appreciated that the barrier layer 202 is employed as a flow support for the hydrogen gas and the air because the gases flow thereover and are transported to and from the fuel cell stack 2 along the barrier layer 202. As the hydrogen gas and the air flow thereover, the substantially impermeable barrier layer 202 also advantageously resists a crossover and intermixing of the hydrogen gas and the air. The barrier layer 202 also militates against a short circuit of the fuel cell stack 2, for example, by providing an insulating layer between at least one of the first and second electrodes 206, 208, the first and second DM 214, 216, the first electrode 206 and the second DM 216, the second electrode 208 and the first DM 214, and the plates of the fuel cell stack 2, such as between bipolar plate 8, and one of the unipolar plates 14, 16.

It should also be understood that the optimized dimensions of the electrolyte membrane 204, which are facilitated by the joint configurations of the present disclosure, allows for an efficient use of the electrolyte membrane 204 materials. A quantity of the electrolyte membrane 204 material employed according to the present disclosure may be minimized. Illustratively, electrolyte membrane 204 material along at least one of the active region 9 and the feed region 10 may be replaced with the barrier layer 202. Additionally, as the electrolyte membranes 204 may not extend substantially into the feed regions 10 of the fuel cell stack 2, additional protective coatings and layers are not required to militate against corrosion of the bipolar plate 8, and unipolar plates 14, 16.

While certain representative embodiments and details have been shown for purposes of illustrating the invention, it will be apparent to those skilled in the art that various changes may be made without departing from the scope of the disclosure, which is further described in the following appended claims.

What is claimed is:

1. A unitized electrode assembly for a fuel cell having an active region and a feed region, the comprising: an electrolyte membrane disposed between a pair of electrodes, the electrolyte membrane and the pair of electrodes disposed between a pair of diffusion media and configured to be disposed at the active region of the fuel cell, wherein the electrolyte membrane is configured to not extend substantially into the feed region; and a barrier layer coupled to the electrolyte membrane, the barrier layer configured to be disposed at the feed region of the fuel cell, wherein the pair of diffusion media includes a first diffusion medium and a second diffusion medium, the barrier layer disposed in-line with the first diffusion medium and on the second diffusion medium, and wherein the barrier layer does not overlap with the first diffusion medium, an end of the barrier layer terminates adjacent an end of the first diffusion medium, and a surface of the barrier layer abuts the second diffusion medium.

2. The unitized electrode assembly of claim 1, wherein the electrolyte membrane has an exposed portion that extends from between the pair of electrodes, the exposed portion overlapping a portion of the barrier layer.

3. The unitized electrode assembly of claim 2, wherein at least one of the electrodes overlaps the barrier layer.

4. The unitized electrode assembly of claim 1, wherein at least one of the pair of electrodes extends to an edge of the electrolyte membrane.

5. The unitized electrode assembly of claim 1, wherein the barrier layer is disposed between the electrolyte membrane and one of the electrodes.

6. The unitized electrode assembly of claim 1, further including at least one joint film disposed on and adapted to couple the barrier layer to the electrolyte membrane.

7. The unitized electrode assembly of claim 6, wherein the joint film is layered between one of the pair of DM and the barrier layer.

8. The unitized electrode assembly of claim 6, wherein the barrier layer and an exposed portion of the joint film are disposed beyond an edge of at least one of the pair of diffusion media.

9. The unitized electrode assembly of claim 1, including a pair of joint films coupled to at least one of the electrolyte membrane and one of the electrodes, the barrier layer disposed between the pair of joint films.

10. The unitized electrode assembly of claim 9, wherein one of the pair of joint films is layered between one of the pair of DM and the barrier layer.

11. The unitized electrode assembly of claim 9, wherein the barrier layer and a portion of each of the joint films is disposed beyond an edge of the pair of diffusion media.

12. The unitized electrode assembly of claim 1, wherein the barrier layer is disposed on the electrolyte membrane.

13. The unitized electrode assembly of claim 1, wherein the barrier layer is disposed on a joint film and the electrolyte membrane.

14. The unitized electrode assembly of claim 1, wherein the barrier layer has a thickness substantially equal to a thickness of the first diffusion medium.

15. The unitized electrode assembly of claim 1, wherein the barrier layer is formed from at least one of a polyethylene terephthalate (PET), a polyethylene naphthalate (PEN), and a polyimide polymer.

16. The unitized electrode assembly of claim 1, wherein the barrier layer is integral with a gasket.

17. The unitized electrode assembly of claim 1, wherein the barrier layer has a seal formed thereon.

18. A fuel cell, comprising: a pair of fuel cell plates, each of the fuel cell plates having an active region and a feed region; and a unitized electrode assembly disposed between the pair of fuel cell plates, the unitized electrode assembly having an electrolyte membrane disposed between a pair of electrodes, the electrolyte membrane and the pair of electrodes disposed between a pair of diffusion media and disposed at the active region, the electrolyte membrane not extending substantially into the feed region, and a barrier layer coupled to the electrolyte membrane and disposed at the feed region, wherein the pair of diffusion media includes a first diffusion medium and a second diffusion medium, the barrier layer disposed in-line with the first diffusion medium and on the second diffusion medium, and wherein the barrier layer does not overlap with the first diffusion medium, an end of the barrier layer terminates adjacent an end of the first diffusion medium, and a surface of the barrier layer abuts the second diffusion medium.

19. A fuel cell stack, comprising: a plurality of fuel cells, one of the fuel cells having a pair of fuel cell plates, each of the fuel cell plates having an active region and a feed region and a unitized electrode assembly disposed there between, the unitized electrode assembly having an electrolyte membrane disposed between a pair of electrodes, the electrolyte membrane and the pair of electrodes disposed between a pair of diffusion media and disposed at the active region, the electrolyte membrane not extending substantially into the feed region, and a barrier layer coupled to the electrolyte membrane and disposed at the feed region, wherein the pair of diffusion media includes a first diffusion medium and a second diffusion medium, the barrier layer disposed in-line with the first diffusion medium and on the second diffusion medium, and wherein the barrier layer does not overlap with the first diffusion medium, an end of the barrier layer terminates adjacent an end of the first diffusion medium, and a surface of the barrier layer abuts the second diffusion medium.

* * * * *